A. F. STOWE.

STRAP-MACHINE.

No. 7,760. Reissued June 19, 1877.

Witnesses.
S. N. Pipes
S. N. Miller

Aaron F. Stowe.
by his attorney.
R. H. Eddy

N. PETERS, PHOTO-LITHOGRAPHER, WASHINGTON, D. C.

UNITED STATES PATENT OFFICE.

AARON F. STOWE, OF WORCESTER, MASSACHUSETTS.

IMPROVEMENT IN STRAP-MACHINES.

Specification forming part of Letters Patent No. 125,766, dated April 16, 1872; reissue No. 5,462, dated June 24, 1873; reissue No. 7,760, dated June 19, 1877; application filed April 30, 1877.

*To all whom it may concern:*

Be it known that I, AARON F. STOWE, of the city and county of Worcester and State of Massachusetts, have invented a new and useful Improvement in Machines for Operating Upon or Cutting Leather; and do hereby declare the same to be described as follows, reference being had to the accompanying drawings, forming part of this my specification.

The invention relates to machinery for cutting leather; and consists in the combination with the main feed-rollers thereof of an auxiliary feed or pressure roller, arranged therewith substantially in manner and to operate as and for the purpose hereinafter set forth. Such auxiliary roller is arranged in rear of the main feed-rollers, and is provided with means of pressing it toward one, or the upper one, of them, its object being to insure evenness and uniformity in the cutting of the leather, or, in other words, to prevent it from curling or being wrinkled in its passage to or between the main feed-rollers, which is liable to happen when the auxiliary roller is not so used.

Having thus premised, I will now proceed to describe the improvement, with reference to a leather-cutting machine.

Figure 1:
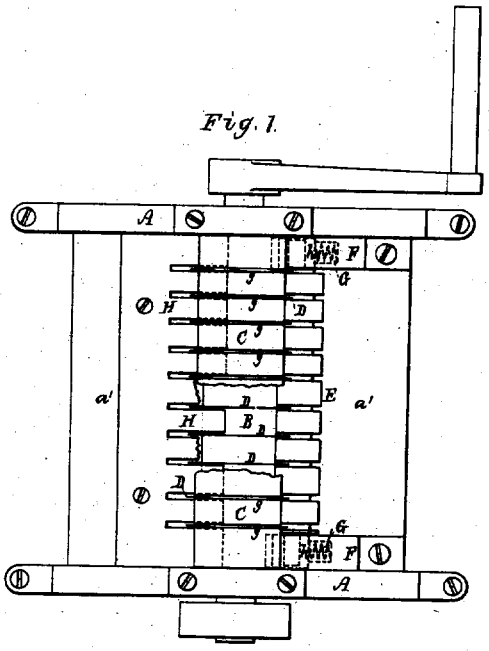
Figure 2:
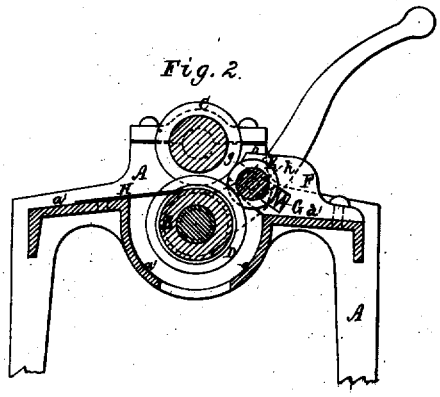

Of the drawings, Figure 1 is a top view, and Fig. 2 a vertical and transverse section, of a machine with my improvement or invention, parts thereof being shown as broken away, and others represented in dotted lines, in order to exhibit its construction.

In such drawings, A denotes the frame for sustaining the main operative parts, such frame having within it two main feed-rollers, B C, one of which is placed directly over the other. Each roller has its journals resting in suitable bearings, duly applied to the end parts of the frame.

The lower roller B has fixed to it, at suitable distances apart, in manner as shown, a series of circular knives, D, which are to enter grooves *g* in the upper roller C.

The frame A is provided with platforms *a′ a′*, arranged with the lower of the main feed-rollers in manner as shown, such platforms being extended around and underneath the said lower feed-roller, in manner as indicated in Fig. 2, in order to shield and protect the edges of the cutters or knives D thereof.

E is the auxiliary or smoothing roller, it being arranged as represented, and having its journals supported in bearings or boxes *h*, placed on inclined slots in brackets F F attached to the frame A. Each of these bearings or boxes *h* is provided with a spring, G, to press it forward in the direction of the upper feed-roller.

The said roller E, disposed in the angular space in rear of the bite of the rollers B C, is grooved or channeled to receive the knives. By means of it the leather—which, in order to be operated on by the knives, has to pass over it (the roller E) and is drawn between it and the upper feed-roller, and thence between the two feed-rollers B C—is prevented from wrinkling, so as to be cut evenly. The springs G allow the roller E to yield or accommodate itself to the varying thickness of the leather, which, as it may pass from between the feed-rollers B C, will be received upon a guide-plate, H, affixed to the front platform *a′*, and extended into the space between such rollers. This plate H is slotted to receive the knives, in manner as shown in Figs. 1 and 2. The knives may be arranged at equal or unequal distances apart, according as it may be desired to separate the leather into strips of equal or different widths. In this way the machine may be adapted to so cut at one and the same time the leather.

This construction is particularly advantageous in workshops where boots of different, or men's and boys', sizes are made. The sheet of leather, while being fed forward for being cut, is compelled to bend and move in a curved path about the auxiliary roller, and, under the pressure thereof, becomes evened, or is thereby prevented from wrinkling before entering between the main feed-rollers and being cut or split. Without the auxiliary feed or pressure roller, arranged and combined with the main feed-rollers, the leather is liable to curb or warp, or become uneven, so as not to be properly cut.

Having thus described my invention, what I claim as new is as follows—that is to say:

In a machine for cutting leather, the combination, with the main feed-rollers B C thereof, of an auxiliary spring-pressed feed or pressure roller, E, arranged therewith, substantially in manner and to operate as and for the purpose set forth.

AARON F. STOWE.

Witnesses:
R. H. EDDY,
J. R. SNOW.